United States Patent [19]

Tange et al.

[11] Patent Number: 4,480,620

[45] Date of Patent: Nov. 6, 1984

[54] FUEL SUPPLY SYSTEM OF INTERNAL COMBUSTION ENGINE

[75] Inventors: Shoji Tange; Minoru Imajyo, both of Yokosuka; Ryuzaburo Inoue, Yokohama; Yasuhiko Nakagawa, Kamakura, all of Japan

[73] Assignee: Nissan Motor Company, Limited, Yokohama, Japan

[21] Appl. No.: 415,026

[22] Filed: Sep. 7, 1982

[30] Foreign Application Priority Data

Oct. 26, 1981 [JP] Japan .................................. 56-170897

[51] Int. Cl.$^3$ ...................... F02D 5/00; F02M 31/00; F02M 51/00; F02M 39/02
[52] U.S. Cl. ..................................... 123/478; 123/275
[58] Field of Search ........................ 123/294, 478, 27 J

[56] References Cited

U.S. PATENT DOCUMENTS

| 4,213,425 | 7/1980 | Read ..................................... 123/478 |
| 4,258,674 | 3/1981 | Wolff ................................... 123/478 |
| 4,359,991 | 11/1982 | Stumpp et al. ....................... 123/478 |
| 4,372,278 | 2/1983 | Smith .................................. 123/478 |

FOREIGN PATENT DOCUMENTS 105157  4/1917  United Kingdom ................ 123/275

OTHER PUBLICATIONS

"Exhaust Emission Control by the Ford Programmed Combustion Process-PROCO" by A. Simko, M. A. Choma and L. L. Repko, Society of Automotive Engineers 720052 Automotive Engineering Congress, Jan. 10–14, 1972.

"A New Concept of Stratified Charge Combustion-the Ford Combustion Process [FCP]" by I. N. Bishop and Aladar Simko, Society of Automotive Engineers 680041 Automotive Engineering Congress, Jan. 8–12, 1968.

"The Ford PROCO Engine Update" by A. J. Scussel, A. O. Simko and W. R. Wade, Society of Automotive Engineers 780699 West Coast Meeting, Aug. 7–10, 1978.

Primary Examiner—Raymond A. Nelli
Attorney, Agent, or Firm—Lane, Aitken & Kananen

[57] ABSTRACT

A fuel supply system of an internal combustion engine for an automotive vehicle, comprising engine load detecting means operative to detect load on the internal combustion engine and to produce an output signal representative of the detected engine load; an electrically-operated fuel-injection nozzle assembly projecting into a combustion chamber of a power cylinder of the engine and operative to inject fuel into the combustion chamber; and an electric control unit electrically connected to the engine load detecting means and the fuel-injection nozzle assembly and operative to produce control signals to determine the durations of fuel injection and the fuel injection timings of the nozzle assembly on the basis of the signals, the fuel injection timings being determined to occur in the presence of a relatively low gas pressure in the combustion chamber.

7 Claims, 6 Drawing Figures

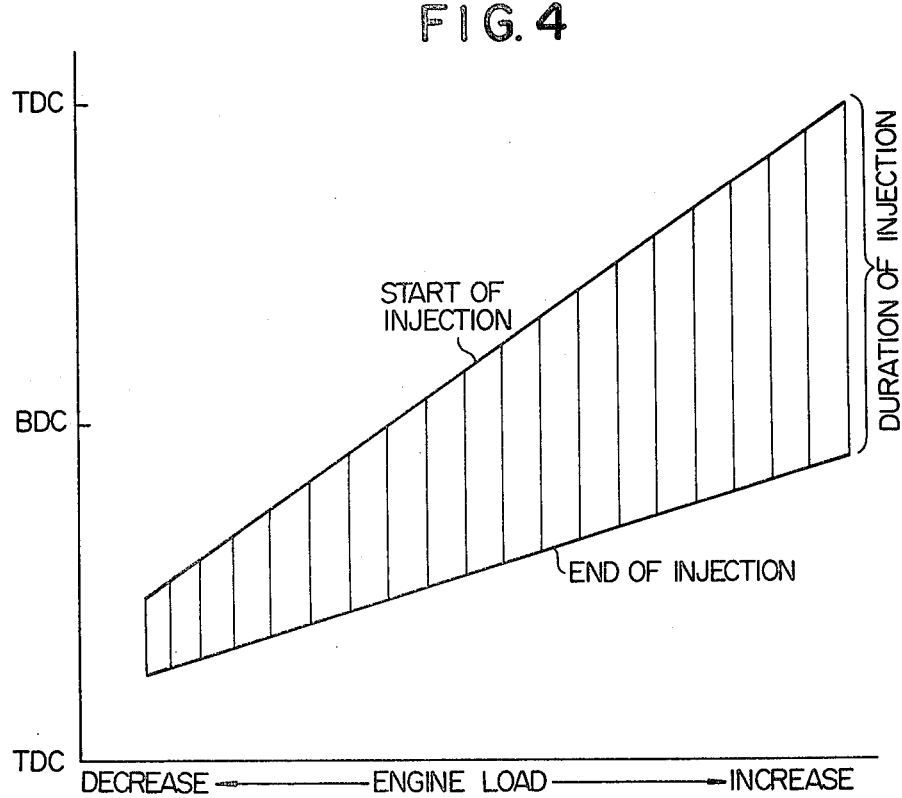

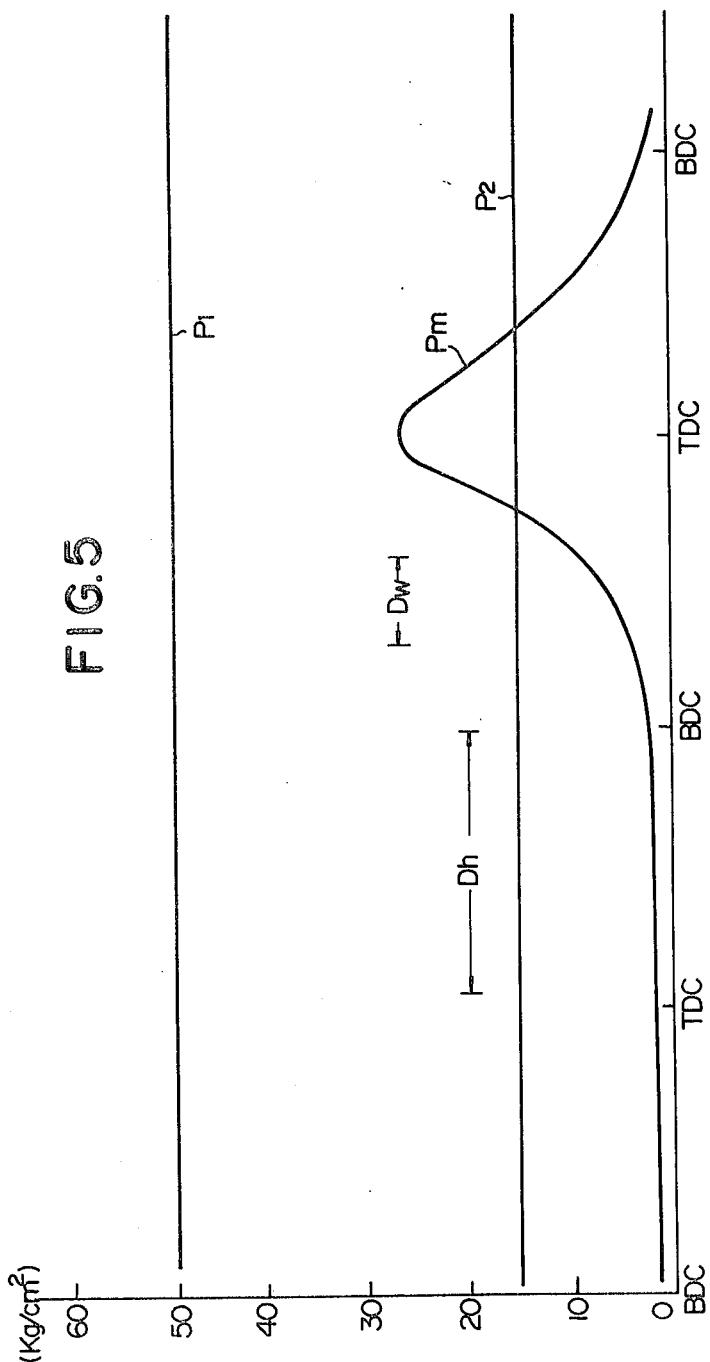

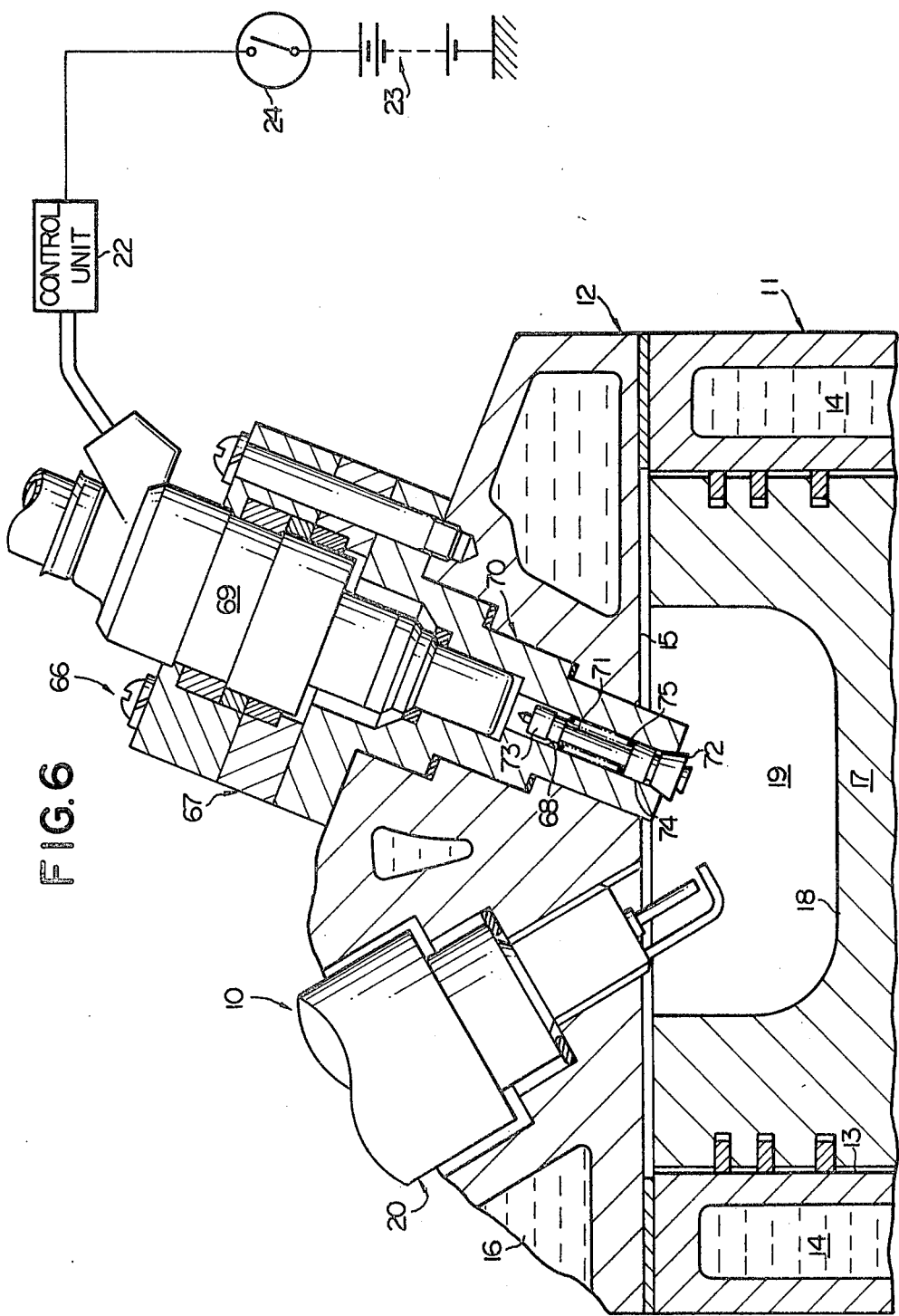

FUEL SUPPLY SYSTEM OF INTERNAL COMBUSTION ENGINE

FIELD OF THE INVENTION

The present invention relates to a fuel supply system of an automotive internal combustion engine.

SUMMARY OF THE INVENTION

In accordance with the present invention, there is provided a fuel supply system of an internal combustion engine for an automotive vehicle, comprising engine load detecting means operative to detect load on the internal combustion engine and to produce an output signal representative of the detected engine load; an electrically-operated fuel-injection nozzle assembly projecting into a combustion chamber of a power cylinder of the engine and operative to inject fuel into the combustion chamber; and an electric control unit electrically connected to the engine load detecting means and the fuel-injection nozzle assembly and operative to produce control signals to determine the durations of fuel injection and the fuel injection timings of the nozzle assembly on the basis of the signals, the fuel injection timings being determined to occur in the presence of a relatively low gas pressure in the combustion chamber.

BRIEF DESCRIPTION OF THE DRAWINGS

The drawbacks of a prior-art fuel supply system of an automotive internal combustion engine and the features and advantages of a fuel supply system according to the present invention will be more clearly understood from the following description taken in conjunction with the accompanying drawings in which like reference numerals designate similar or corresponding, units, members and elements and in which:

FIG. 4 is a graphic representation of the relationship between the load applied to an engine and the fuel injection timings determined in the fuel supply system embodying the present invention;

FIG. 5 is a graphic representation of the pressures at which fuel is to be discharged from the fuel-injection nozzle assembly of a prior-art fuel supply system and the fuel-injection nozzle assembly of a fuel supply system proposed by the present invention; and FIG. 6 is a sectional view showing portions of a modification of the fuel-injection nozzle assembly shown in FIG. 2.

DESCRIPTION OF THE PRIOR ART

Figure 1:
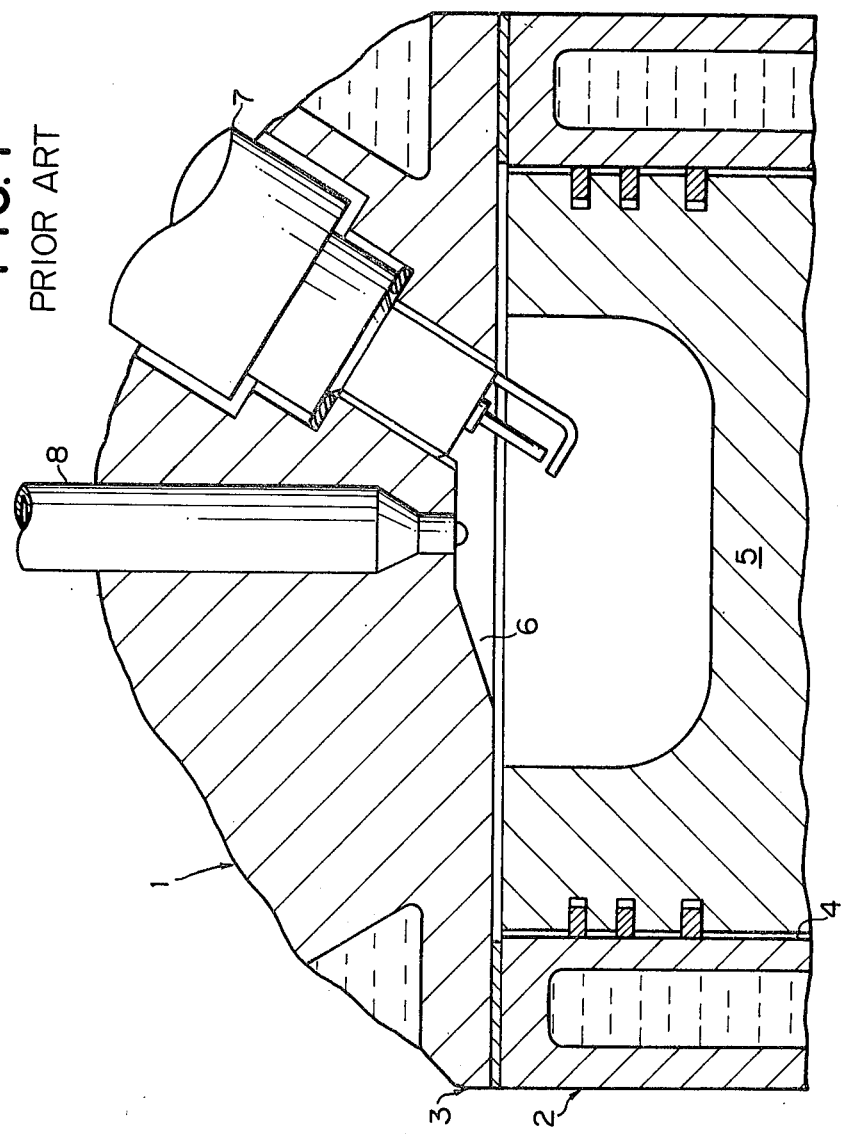
FIG. 1 is a sectional view showing portions of a fuel-injection nozzle assembly of an automotive internal combustion engine using a prior art fuel supply system.

In FIG. 1 of the drawings, there are shown portions of a power cylinder 1 which forms part of a known automotive multiple-cylinder internal combustion engine. The internal combustion engine herein shown is of the type discussed in SAE Technical Paper Series No. 720052 edited and published by Society of Automotive Engineers, New York, N.Y., U.S.A. The power cylinder 1 is one of the plurality of power cylinders formed in a single cylinder block and head assembly including a cylinder block 2 and a cylinder head 3 which are bolted together. The cylinder block 2 is formed with an elongated cylinder bore 4 which is open toward the cylinder head 3. A reciprocating piston 5 is axially movable back and forth in the cylinder bore 4 and forms a variable-volume combustion chamber 6 between the cylinder head 3 and the piston 5. An ignition spark plug 7 having center and ground electrodes forming a spark gap therebetween and a fuel injection nozzle assembly 8 project into the combustion chamber 6 through the above mentioned wall portion of the cylinder head 3. Though not shown in the drawings, the fuel injection nozzle assembly 8 comprises a valve and a spring urging the valve to close and communicates with a fuel-feed pump of the plunger type.

The fuel-feed pump is designed to be operative to cyclically deliver fuel at a predetermined pressure (usually higher than 50 kgs/cm$^2$) which is selected to overcome the force of the spring in the fuel injection nozzle assembly 8. When fuel under such a pressure is delivered from the fuel-feed pump to the fuel injection nozzle assembly 8, the spring-loaded valve in the fuel injection nozzle assembly 8 is caused to open and permits the fuel to be discharged into the combustion chamber 6 during each compression stroke of the power cylinder 1. The beginning, rate and duration of injection during each compression stroke are controlled by regulating the pressure of the fuel to be delivered from the fuel-feed pump. The beginning and duration of injection are controlled by regulating the timings at which fuel is to be pressurized in the pump, and the volume of the fuel to be injected is controlled by regulating the period of time for which the fuel is to be pressurized in the pump. The fuel thus injected directly into the combustion chamber 6 is mixed with air inducted into the combustion chamber 6 through the valved air-intake port (not shown) formed in the cylinder head 3. The resultant mixture of air and fuel is agitated in the combustion chamber and is fired by the spark produced between the center and ground electrodes of the ignition spark plug 7 for being explosively combusted in the combustion chamber 6.

A drawback is encountered in an automotive internal combustion engine of the above described nature in that the available range of injection timing is so narrow that the ignition timing can not be controlled appropriately over a wide range of engine load. This is because of the fact that the fuel injection timing and quantity are controlled by regulating the fuel pressure to oppose the force of the spring in the fuel injection nozzle assembly 8 and that the fuel pressure thus regulated must be selected at an unduly high level of 50 kgs/cm$^2$ or more as previously noted. The present invention contemplates provision of an improved fuel supply system for an automotive internal combustion engine to eliminate such a drawback encountered in an automotive internal combustion engine of the described nature.

DESCRIPTION OF THE PREFERRED EMBODIMENTS

Figure 2:
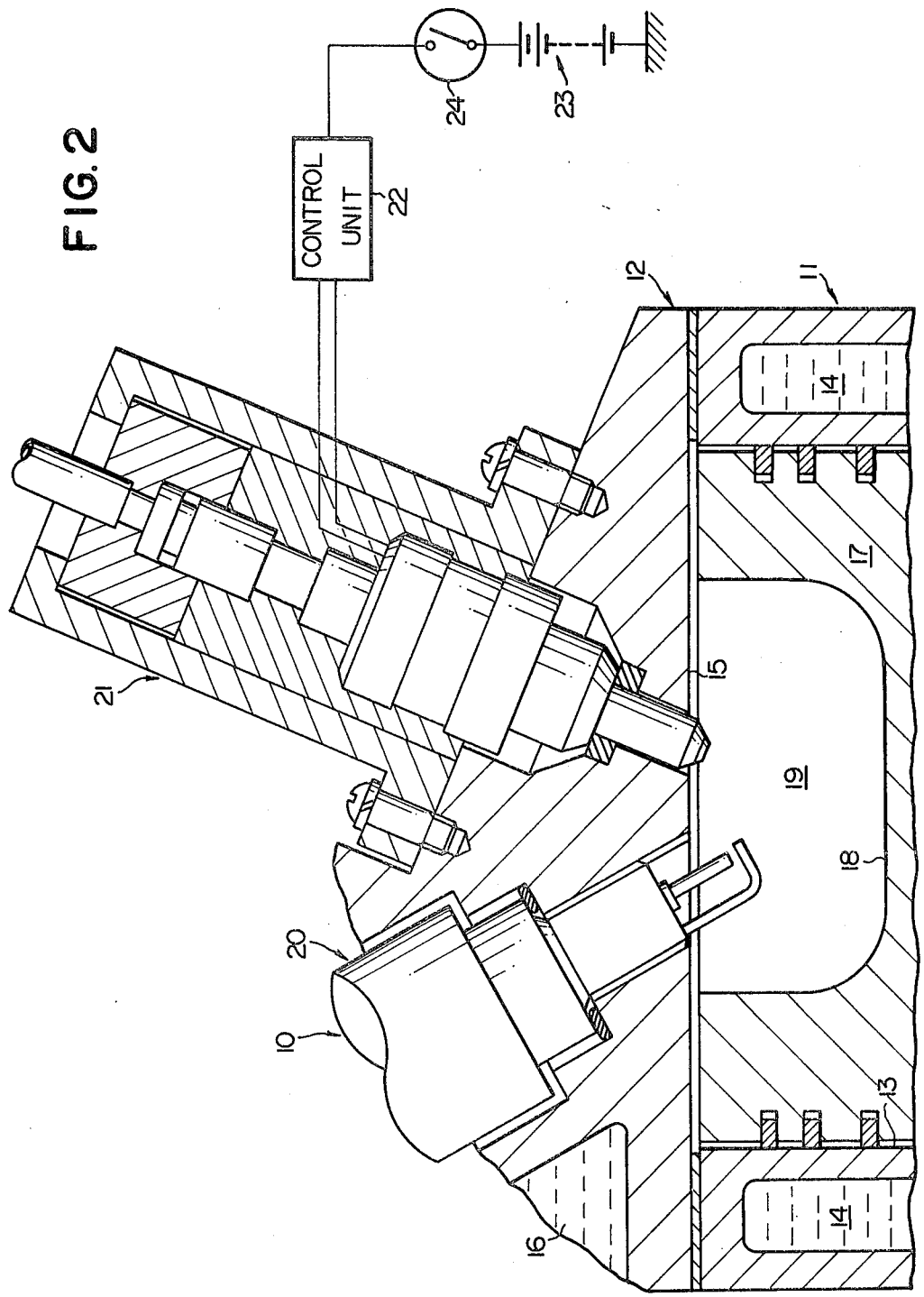
FIG. 2 is a sectional view showing portions of a power cylinder of an automotive internal combustion engine using a fuel supply system embodying the present invention.

Referring to FIG. 2 of the drawings, an automotive internal combustion engine to incorporate a fuel supply system embodying the present invention is assumed to be per se similar in construction to the internal combustion engine described with reference to FIG. 1 and thus comprises a power cylinder 10 which is one of the plurality of power cylinders formed in a single cylinder block and head assembly. The cylinder block and head assembly includes a cylinder block 11 and a cylinder head 12 which are bolted together with a suitable sealing element such as a gasket closely interposed therebetween. The cylinder block 11 is formed with an elongated cylinder bore 13 and a cooling water jacket 14 surrounding the cylinder bore 13. On the other hand, the cylinder head 3 has a wall portion 15 above the bore 13 in the cylinder block 11 and is formed with valved air-intake and exhaust ports (not shown in FIG. 2) and a cooling water jacket 16. A reciprocating piston 17 formed with a recess 18 open toward an internal surface of the wall portion 15 of the cylinder head 12 is axially movable back and forth in the cylinder bore 13 and forms a variable-volume combustion chamber 19 between the piston 17 and the internal surface of the wall portion 15 of the cylinder head 12. The piston 17 is formed with circumferential grooves in its outer peripheral wall portion and has fitted therein piston rings 20 which are held in slidable contact with the inner peripheral surface of the cylinder block 11.

An ignition spark plug 20 and a fuel-injection nozzle assembly 21 project into the combustion chamber 19 through the above mentioned wall portion 15 of the cylinder head 12. The spark plug 20 has center and ground electrodes forming a spark gap therebetween as is customary. The fuel-injection nozzle assembly 21 is herein assumed, by way of example, as being of the externally-open type and comprises a valve and a spring urging the valve to close, though not shown in the drawings. The valve communicates with a suitable source of fuel (not shown) and is electrically or electromagnetically controlled by signals supplied from an electric control unit 22 which is electrically connected between the valve in the fuel-injection nozzle assembly 21 and a d.c. power source such as a battery 23 across a switch 24. The switch 24 may be constituted by an ignition switch. In the fuel supply system embodying the present invention, the fuel-injection nozzle assembly 21 thus arranged is designed to discharge fuel therefrom at a relatively low pressure of, for example, about 15 kgs/cm$^2$.

Figure 3:
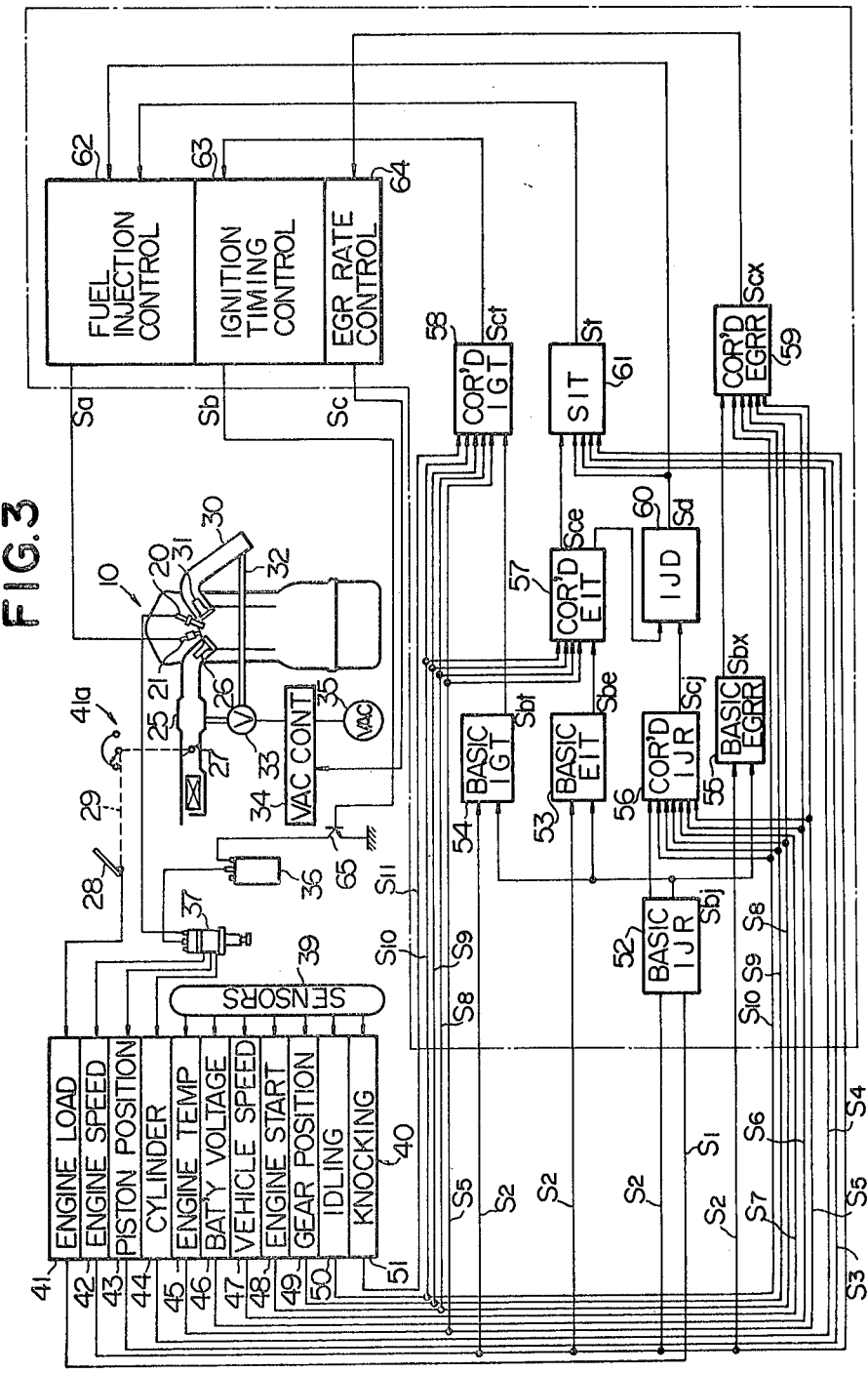
FIG. 3 is a block diagram showing the circuit arrangement of a control unit forming part of the fuel supply system embodying the present invention.

The electric control unit 22 is adapted to produce control signals in response to various operating conditions of the internal combustion engine. In FIG. 3 of the drawings, the internal combustion engine is shown further comprising an air induction system including an air-intake manifold 25 leading to the combustion chamber 19 of each of the power cylinders through an air-intake port provided with an intake valve 26, and a throttle valve 27 provided upstream of the intake manifold 25. The throttle valve 27 is operatively connected to an accelerator pedal 28 through a mechanical linkage 29 and is adapted to control the flow rate of air into the air-intake manifold depending upon the load applied to the engine with the accelerator pedal 28 depressed by a vehicle driver. The internal combustion engine shown in FIG. 3 further comprises an exhaust system including an exhaust manifold 30 leading from the combustion chamber 19 of each of the power cylinders and provided with an exhaust valve 31, and an exhaust-gas recirculation system including an exhaust-gas recirculation passageway 32 leading from the exhaust manifold to the air-intake manifold 25 and an exhaust-gas recirculation rate control valve unit 33 provided in the exhaust-gas recirculation passageway 32. Exhaust gases emitted from the power cylinders to the exhaust manifold 30 are thus partially recirculated into the air-intake manifold 25 at a rate which is controlled by the valve unit 33. The exhaust-gas recirculation rate control valve unit 33 is assumed, by way of example, as being of the vacuum-operated type and is controlled by a solenoid-operated vacuum metering valve unit 34 intervening, in effect, between the exhaust-gas recirculation rate control valve unit 33 and a suitable source of vacuum such as a vacuum pump 35.

In FIG. 3, the internal combustion engine is shown further comprising an ignition system including an ignition coil unit 36 and an ignition distributor 37 in addition to the ignition spark plug 20 and the ignition switch 24 described with reference to FIG. 2. As is well known in the art, the ignition coil 36 has primary and secondary windings and is adapted to build up high-voltage surges in the secondary winding in response to a current supplied to the primary winding. The ignition distributor 37 is electrically connected between the spark plug 20 and the ignition coil unit 36 and is operative to alternately close and open the primary winding of the ignition coil unit 36 and to distribute the resulting high-voltage surges from the secondary winding thereof to the spark plug 20. The ignition is timed so that the primary winding of the coil unit 36 is closed at timings when the pistons in the individual power cylinders are moving toward the top dead center (TDC) positions in the cylinder bores during compression strokes of the power cylinders.

The electric control unit 22 is operative to control the timings of the start of injection and the durations of injection during compression strokes of the individual power cylinders, the ignition timings at which the primary winding of the ignition coil unit 36 is to be closed, and the rates of exhaust-gas recirculation through the exhaust-gas recirculation rate control valve 33. For this purpose, the electric control unit 22 is supplied with basic input signals from sensors 39 and detectors 40 responsive to various operational parameters of the automotive vehicle such as the engine and the power transmission system (not shown) of the vehicle. In the fuel supply system embodying the present invention, the detectors 40 comprise an engine-load detector 41, an engine-speed detector 42, a piston-position detector 43, a cylinder detector 44, an engine-temperature detector 45, a battery-voltage detector 46, a vehicle-speed detector 47, an engine-start detector 48, a gear-position detector 49, an idling detector 50, and a knocking detector 51. Of these detectors 41 to 51, the last seven detectors 45 to 51 are electrically connected to the sensors 39 and are thus supplied with signals representative of the operational parameters of the vehicle as detected by the sensors 39.

The engine-load detector 41 is adapted to detect the load applied to the engine and to produce an output signal $S_1$ representative of the detected load on the engine. Practically, the engine-load detector 41 is provided in association with the throttle valve 27 in the air induction system of the engine and is operative to detect the degree of opening of the throttle valve 27 and produce the output signal $S_1$ representative of the detected degree of opening of the throttle valve 27. A potentiometer 41a may for this purpose be provided in conjunction with the mechanical linkage 29 between the throttle valve 27 and the accelerator pedal 28. The potentiometer 41a thus arranged is adapted to supply the engine-load detector 41 with a voltage variable with the amount of displacement of the mechanical linkage 29 moved by the accelerator pedal 28 when the throttle valve 27 is to be driven to turn between maximum and minimum open positions (viz., full throttle and idling positions) through a part throttle position. If desired, the engine-load detector 41 may be of such a nature that is responsive to the flow of air through the induction system of the engine. On the other hand, the engine-speed detector 42 is adapted to produce an output signal $S_2$ representative of the revolution speed of the output shaft of the engine. Thus, the engine-speed detector 42 is preferably provided in association with crankshaft revolution speed detecting means (not shown) or the ignition distributor 37 so as to be operative to produce the output signal $S_2$ every time the crankshaft of the engine turns through a first predetermined angle of, for example, 2 degrees about the axis of rotation thereof. The piston-position detector 43 is adapted to produce output signals $S_3$ representative of predetermined axial positions such as the top dead center (TDC) and bottom dead center (BDC) positions of the piston 17 in the cylinder bore 13 (FIG. 2) of each of the power cylinders of the engine. Thus, the piston-position detector 43 is preferably provided also in association with the above mentioned crankshaft revolution speed detecting means or the ignition distributor 37 and is operative to produce the output signal $S_3$ every time the crankshaft of the engine turns through a second predetermined angle of, for example, 180 degrees about the axis of rotation thereof. The cylinder detector 44 is adapted to produce output signals $S_4$ when the individual power cylinders of the engine reach the above mentioned predetermined axial positions by turns. The cylinder detector 44 is thus also preferably provided also in association with the above mentioned crankshaft revolution speed detecting means or the ignition distributor 37 and is operative to produce the output signal $S_4$ every time the crankshaft of the engine turns through a third predetermined angle of, for example, 720 degrees about the axis of rotation thereof. The engine-temperature detector 45 is electrically connected to an engine temperature sensor (not shown) included in the sensors 39 and is operative to detect the temperature of, for example, the cooling water in the cooling water jacket 14 or 16 of the power cylinder 10 (FIG. 2) and produce an output signal $S_5$ variable with the detected temperature of the engine cooling water. The battery-voltage detector 46 is electrically connected to a battery voltage sensor (not shown) included in the sensors 39 and is operative to detect the voltage of the battery 23 (FIG. 2) and produce an output signal $S_6$ variable with the detected voltage of the battery 23. The vehicle-speed detector 47 is electrically connected to a vehicle speed sensor (not shown) included in the sensors 39 and is operative to detect the vehicle speed and produce an output signal $S_7$ variable with the detected vehicle speed. The engine-start detector 48 is electrically connected to an engine start sensor (not shown) included in the sensors 39 and is operative to detect the start of the engine and produce an output signal $S_8$ when the engine is cranked for starting. The engine start sensor may be connected to or otherwise provided in association with the ignition switch 24 (FIG. 2) so as to actuate the engine-start detector 48 when the ignition switch 24 is in the "START" position thereof. The gear-position detector 49 is electrically connected to a gear position sensor (not shown) included in the sensors 39 and is operative to detect a predetermined condition such as a neutral-gear condition of the power transmission system of the vehicle and produce output signals $S_9$ representative of the detected predetermined condition of the power transmission system. The signals $S_9$ may be in the form of pulses with a predetermined pulsewidth. The idling detector 50 is electrically connected to an idle sensor (not shown) included in the sensors 39 and is operative to detect an idling condition of the engine and produce an output signal $S_{10}$ when the engine is in an idling condition with the throttle valve 27 held in the minimum open position thereof in the air induction system of the engine. The knocking detector 51 is electrically connected to a knocking sensor (not shown) included in the sensors 39 and is operative to detect a knocking condition of the engine and produce an output signal $S_{11}$ when knocking is being caused in the engine.

The electric control unit 22 of the fuel supply system embodying the present invention comprises a basic injection-rate (IJR) calculator circuit 52, a basic end-of-injection timing (EIT) calculator circuit 53, a basic ignition timing (IGT) calculator circuit 54, and a basic exhaust-gas recirculation rate (EGRR) calculator circuit 55. The basic injection-rate calculator circuit 52 has input terminals respectively connected to the output terminals of the engine-load detector 41 and the engine-speed detector 42 and is operative to determine a basic desired fuel injection rate on the basis of the data preliminarily stored in the control unit 22 and the pieces of information represented by the respective output signals $S_1$ and $S_2$ from the detectors 41 and 42 and to produce digital output signals $S_{bj}$ representative of the basic desired fuel injection rate thus determined. The basic end-of-injection timing calculator circuit 53 has input terminals respectively connected to the output terminals of the engine-speed detector 42 and the basic injection-rate calculator circuit 52 and is operative to determine a basic desired end-of-injection timing on the basis of the data preliminarily stored in the control unit 22 and the pieces of information represented by the output signals $S_2$ from the detector 42 and the digital output signals $S_{bj}$ from the basic injection-rate calculator circuit 52 and to produce digital output signals $S_{be}$ representative of the basic desired timing at which the injection of fuel from the fuel-injection nozzle assembly 21 is to be terminated during each cycle of operation of each of the power cylinders. The basic ignition timing calculator circuit 54 also has input terminals respectively connected to the output terminals of the engine-speed detector 42 and the basic injection-rate calculator circuit 52 and is operative to determine a basic desired ignition timing on the basis of the data preliminarily stored in the control unit 22 and the pieces of information represented by the output signals $S_2$ from the detector 42 and the digital output signals $S_{bj}$ from the basic injection-rate calculator circuit 52 and to produce digital output signals $S_{bt}$ representative of the basic desired ignition timing thus determined. The basic exhaust-gas recirculation rate calculator circuit 55 also has input terminals respectively connected to the output terminals of the engine-speed detector 42 and the basic injection-rate calculator circuit 52 and is operative to determine a basic desired exhaust-gas recirculation rate on the basis of the data preliminarily stored in the control unit 22 and the pieces of information represented by the output signals $S_2$ from the detector 42 and the digital output signals $S_{bj}$ from the basic injection-rate calculator circuit 52 and to produce digital output signals $S_{bx}$ representative of the basic desired exhaust-gas recirculation rate thus determined.

The control unit 22 of the system embodying the present invention further comprises a corrected injection-rate (IJR) calculator circuit 56, a corrected end-of-injection timing (EIT) calculator circuit 57, a corrected ignition timing (IGT) calculator circuit 58, and a corrected exhaust-gas recirculation rate (EGRR) calculator circuit 59. The corrected injection-rate calculator circuit 56 has input terminals respectively connected to the output terminals of the engine-temperature detector 45, battery-voltage detector 46, vehicle-speed detector 47, engine-start detector 48, gear-position detector 49, idling detector 50 and basic injection-rate calculator circuit 52 and is operative to determine a corrected fuel injection rate on the basis of the data preliminarily stored in the control unit 22 and the pieces of information represented by the respective output signals $S_5$, $S_6$, $S_7$, $S_8$, $S_9$ and $S_{10}$ from the detectors 45, 46, 47, 48, 49 and 50 and the digital output signals $S_{bj}$ from the basic injection-rate calculator circuit 52. The corrected injection-rate calculator circuit 56 thus produces digital output signals $S_{cj}$ representative of the corrected fuel injection rate thus determined. The corrected end-of-injection timing calculator circuit 57 has input terminals respectively connected to the output terminals of the engine-temperature detector 45, engine-start detector 48, gear-position detector 49, idling detector 50 and basic end-of-injection timing calculator circuit 53 and is operative to determine a corrected end-of-injection timing on the basis of the data preliminarily stored in the control unit 22 and the pieces of information represented by the respective output signals $S_5$, $S_8$, $S_9$ and $S_{10}$ from the detectors 45, 48, 49 and 50 and the digital output signals $S_{be}$ from the basic end-of-injection timing calculator circuit 53. The corrected end-of-injection timing calculator circuit 57 thus produces digital output signals $S_{ce}$ representative of the corrected timing at which the injection of fuel from the fuel-injection nozzle assembly 21 (FIG. 2) is to be terminated during each cycle of operation of each of the power cylinders. The corrected ignition timing calculator circuit 58 has input terminals respectively connected to the output terminals of the engine-temperature detector 45, engine-start detector 48, gear-position detector 49, idling detector 50, knocking detector 51 and basic ignition timing calculator circuit 54 and is operative to determine a corrected ignition timing on the basis of the data preliminarily stored in the control unit 22 and the pieces of information represented by the respective output signals $S_5$, $S_8$, $S_9$, $S_{10}$ and $S_{11}$ from the detectors 45, 48, 49, 50 and 51 and the digital output signals $S_{bt}$ from the basic ignition timing calculator circuit 54. The corrected ignition timing calculator circuit 58 thus produces digital output signals $S_{ct}$ representative of the corrected ignition timing thus determined. The corrected exhaust-gas recirculation rate calculator circuit 59 also has input terminals respectively connected to the output terminals of the engine-temperature detector 45, battery-voltage detector 46, engine-start detector 48, gear-position detector 49, idling detector 50 and basic exhaust-gas recirculation rate calculator circuit 55 and is operative to determine a corrected exhaust-gas recirculation rate on the basis of the data preliminarily stored in the control unit 22 and the pieces of information represented by the respective output signals $S_5$, $S_6$, $S_8$, $S_9$, and $S_{10}$ from the detectors 45, 46, 48, 49 and 50 and the digital output signals $S_{bx}$ from the basic exhaust-gas recirculation rate calculator circuit 55 and to produce digital output signals $S_{cx}$ representative of the corrected exhaust-gas recirculation rate thus determined.

The control unit 22 further comprises a fuel-injection duration (IJD) calculator circuit 60 and a start-of-injection timing (SIT) calculator circuit 61. The fuel-injection duration calculator circuit 60 has input terminals respectively connected to the output terminals of the corrected injection-rate calculator circuit 56 and the corrected end-of-injection timing calculator circuit 57 and is operative to determine an optimum duration for which fuel is to be discharged from the fuel-injection nozzle assembly 21 during each cycle of operation of each of the power cylinders, on the basis of the data preliminarily stored in the control unit 22 and the pieces of information represented by the digital output signals $S_{cj}$ and $S_{ce}$ from the calculator circuits 56 and 57, respectively. The fuel-injection duration calculator circuit 60 thus produces digital output signals $S_d$ representative of the optimum duration of fuel injection thus determined. The data stored in the control unit 22 may be such that are representative of the performance characteristics of the fuel-injection nozzle assembly 21 at various gas pressures in the combustion chamber 19 in each of the power cylinders of the engine. On the other hand, the start-of-injection timing calculator circuit 61 has input terminals respectively connected to the output terminals of the engine-speed detector 42, piston-position detector 43, cylinder detector 44, corrected end-of-injection timing calculator circuit 57 and fuel-injection duration calculator circuit 60 and is operative to determine an optimum start-of-injection timing on the basis of the data preliminarily stored in the control unit 22 and the pieces of information represented by the respective output signals $S_2$, $S_3$ and $S_4$ and the respective digital output signals $S_{ce}$ and $S_d$ from the calculator circuits 57 and 60. The start-of-injection timing calculator circuit 61 thus produces digital output signals $S_t$ representative of the optimum timing at which injection of fuel is to be started by the fuel-injection nozzle assembly 21 during each cycle of operation of each of the power cylinders.

The electric control unit 22 of the fuel supply system embodying the present invention further comprises a fuel-injection control circuit 62, an ignition timing control circuit 63 and an exhaust-gas recirculation (EGR) rate control circuit 64. The fuel-injection control circuit 62 has input terminals respectively connected to the output terminals of the above described fuel-injection duration calculator circuit 60 and start-of-injection timing calculator circuit 61 and an output terminal connected to the solenoid-operated valve incorporated in the fuel-injection nozzle assembly 21. The fuel-injection control circuit 62 is thus operative to deliver to the solenoid-operated valve of the fuel-injection nozzle assembly 21 a control signal $S_a$ effective to enable the valve to open at a timing dictated by the digital output signals $S_t$ from the start-of-injection timing calculator circuit 61 and to remain open for a period of time dictated by the digital output signals $S_d$ from the fuel-injection duration calculator circuit 60. The ignition timing control circuit 63 has an input terminal connected to the output terminal of the corrected ignition timing calculator circuit 58 and an output terminal connected to the base of a power transistor 65 which has its emitter grounded and its collector connected to the primary winding of the ignition coil unit 36. The ignition timing control circuit 63 is operative to deliver a control signal $S_b$ at a timing dictated by the digital output signals $S_{ct}$ from the corrected ignition timing calculator circuit 58. The control signal $S_b$ is fed to the base electrode of the power transistor 65 so that the primary winding of the ignition coil unit 36 is kept closed for a period of time for which the control signal $S_b$ from the ignition timing control circuit 63 is present. On the other hand, the exhaust-gas recirculation rate control circuit 64 has an input terminal connected to the output terminal of the corrected exhaust-gas recirculation rate calculator circuit 59 and an output terminal electrically connected to the previously described vacuum-metering valve unit 34. The exhaust-gas recirculation rate control circuit 64 is thus operative to deliver to the vacuum-metering valve unit 34 a control signal $S_c$ effective to cause the valve unit 34 to be open to a degree dictated by the digital output signals $S_{cx}$ supplied from the calculator circuit 59.

Description will be hereinafter made regarding the operation of the fuel supply system constructed and arranged as hereinbefore described. Throughout operation of the fuel supply system, the basic injection-rate calculator circuit 52 of the control unit 22 is supplied with the signals $S_1$ and $S_2$ from the engine-load detector 41 and engine-speed detector 42, respectively, and determine a basic desired fuel injection rate on the basis of the data stored in the control unit 22 and the pieces of information represented by the input signals $S_1$ and $S_2$. The basic injection-rate calculator circuit 52 thus produces the digital output signals $S_{bj}$ representative of the basic fuel injection rate desirable for the load being applied to the engine and the revolution speed of the engine crankshaft as represented by the input signals $S_1$ and $S_2$. The digital output signals $S_{bj}$ are supplied, together with the output signals $S_2$ from the engine-speed detector 42, to each of the basic end-of-injection timing calculator circuit 53, basic ignition timing calculator circuit 54 and basic exhaust-gas recirculation rate calculator circuit 55. In response to the signals $S_2$ and $S_{bj}$, the basic end-of-injection timing calculator circuit 53 determines a basic desired end-of-injection timing on the basis of the data stored in the control unit 22 and the pieces of information represented by the input signals $S_1$ and $S_2$. The basic end-of-injection timing calculator circuit 53 thus produces the digital output signals $S_{be}$ representative of the basic end-of-injection timing desirable for the revolution speed of the engine crankshaft as represented by the signals $S_2$. The digital output signals $S_{be}$ are fed, together with the respective output signals $S_5$, $S_8$, $S_9$ and $S_{10}$ from the engine-temperature detector 45, engine-start detector 48, gear-position detector 49 and idling detector 50, to the corrected end-of-injection timing calculator circuit 57 so that the basic desired end-of-injection timing determined by the calculator circuit 53 is corrected on the basis of the signals $S_5$, $S_8$, $S_9$ and $S_{10}$ and the data stored in the control unit 22. The calculator circuit 57 thus produces the digital output signals $S_{ce}$ representative of the corrected end-of-injection timing optimum for the temperature of the engine cooling water and the predetermined condition of the power transmission system as represented by the input signals $S_5$ and $S_9$. The digital output signals $S_{bj}$ are also fed, together with the respective output signals $S_5$, $S_6$, $S_7$, $S_8$, $S_9$ and $S_{10}$ from the engine-temperature detector 45, battery-voltage detector 46, vehicle-speed detector 47, engine-start detector 48, gear-position detector 49 and idling detector 50, to the corrected injection-rate calculator circuit 56 so that the basic desired fuel injection rate determined by the basic injection-rate calculator circuit 52 is corrected on the basis of the signals $S_5$, $S_6$, $S_7$, $S_8$, $S_9$ and $S_{10}$ and the data stored in the control unit 22. The corrected injection-rate calculator circuit 56 thus produces the digital output signals $S_{cj}$ representative of the corrected fuel injection rate optimum for the temperature of the engine cooling water, the voltage of the battery 23 (FIG. 2), the vehicle speed and the predetermined condition of the power transmission system as represented by the input signals $S_5$, $S_6$, $S_7$ and $S_9$. The digital output signals $S_{cj}$ are supplied, together with the digital output signals $S_{ce}$ from the corrected end-of-injection timing calculator circuit 57, to the fuel-injection duration calculator circuit 60, which is accordingly caused to determine an optimum duration of fuel injection and produce the digital output signals $S_d$ representative of the optimum duration of fuel injection on the basis of the corrected fuel injection rate represented by the signals $S_{cj}$ and the corrected end-of-injection timing represented by the signals $S_{ce}$. The digital output signals $S_d$ in turn are fed, together with the digital output signals $S_{ce}$ from the corrected end-of-injection timing calculator circuit 57 to the start-of-injection timing calculator circuit 61 and the respective output signals $S_2$, $S_3$ and $S_4$ from the detectors 42, 43 and 44 and causes the calculator circuit 61 to determine an optimum start-of-injection timing on the basis of the data stored in the control unit 22 and the pieces of information represented by the signals $S_2$, $S_3$, $S_4$ and $S_{ce}$. The start-of-injection timing calculator circuit 61 thus produces the digital output signals $S_t$ representative of the start-of-injection timing optimum for the revolution speed of the engine crankshaft and the position of the piston in a power cylinder of the engine as represented by the signals $S_2$ and $S_3$. The digital output signals $S_d$ and $S_t$ produced respectively by the calculator circuits 60 and 61 as above described are supplied to the fuel-injection control circuit 62 and causes the control circuit 62 to deliver to the solenoid-operated valve of the fuel-injection nozzle assembly 21 the control signal $S_a$ effective to enable the valve to open at a timing dictated by the input signals $S_t$ and to remain open for a period of time dictated by the input signals $S_d$. In the fuel supply system embodying the present invention, the start-of-injection timing calculator circuit 61 is constructed and arranged so that the start-of-injection timings determined by the start-of-injection timing calculator circuit 61 occur in the presence of a relatively low gas pressure in the combustion chamber of each of the power cylinders.

The digital output signals $S_{bj}$ produced by the basic injection-rate calculator circuit 52 is also fed, together with the output signals $S_2$ from the engine-speed detector 42, to the basic ignition timing calculator circuit 54, which is accordingly caused to determine a basic desired ignition timing on the basis of the data stored in the control unit 22 and the pieces of information represented by the input signals $S_2$. The basic ignition timing calculator circuit 54 thus produces the digital output signals $S_{bt}$ representative of the basic ignition timing desirable for the revolution speed of the engine crankshaft as represented by the signals $S_2$. The digital output signals $S_{bt}$ are fed, together with the respective output signals $S_5$, $S_8$, $S_9$, $S_{10}$ and $S_{11}$ from the detectors 45, 48, 49, 50 and 51, to the corrected ignition timing calculator circuit 58 so that the basic desired ignition timing determined by the basic ignition timing calculator circuit 54 is corrected on the basis of the signals $S_5$, $S_8$, $S_9$, $S_{10}$ and $S_{11}$ and the data stored in the control unit 22. The calculator circuit 58 thus produces the digital output signals $S_{ct}$ representative of the corrected ignition timing optimum for the temperature of the engine cooling water and the predetermined condition of the power transmission system as represented by the signals $S_5$ and $S_9$, respectively. The digital output signals $S_{ct}$ produced by the corrected ignition timing calculator circuit 58 in this fashion are supplied to the ignition timing control circuit 63 and causes the control circuit 63 to deliver the control signal $S_b$ at a timing dictated by the input signals $S_{ct}$. The control signal $S_b$ is fed to the base electrode of the power transistor 65 so that the primary winding of the ignition coil unit 36 is kept closed for a period of time for which the control signal $S_b$ from the ignition timing control circuit 63 is present.

The digital output signals $S_{bj}$ produced by the basic injection-rate calculator circuit 52 is further fed to the basic exhaust-gas recirculation rate calculator circuit 55 together with the output signals $S_2$ from the detector 42 and causes the calculator circuit 55 to determine a basic desired exhaust-gas recirculation rate on the basis of the data stored in the control unit 22 and the pieces of information represented by the input signals $S_2$. The basic exhaust-gas recirculation rate calculator circuit 55 thus produces the digital output signals $S_{bx}$ representative of the basic exhaust-gas recirculation rate desirable for the revolution speed of the engine crankshaft as represented by the signal $S_2$. The digital output signals $S_{bx}$ are fed to the corrected exhaust-gas recirculation rate calculator circuit 59 together with the respective output signals $S_5$, $S_6$, $S_8$, $S_9$ and $S_{10}$ from the detectors 45, 46, 48, 49 and 50, to the corrected exhaust-gas recirculation rate calculator circuit 59 so that the basic desired exhaust-gas recirculation rate determined by the basic exhaust-gas recirculation rate calculator circuit 55 is corrected on the basis of the signals $S_5$, $S_6$, $S_8$, $S_9$ and $S_{10}$ and the data stored in the control unit 22. The corrected exhaust-gas recirculation rate calculator circuit 59 thus produces the digital output signals $S_{cx}$ representative of the corrected exhaust-gas recirculation rate optimum for the temperature of the engine cooling water, voltage of the battery 23 (FIG. 2) and the predetermined condition of the power transmission system as represented by the signals $S_5$, $S_6$ and $S_9$, respectively. The digital output signals $S_{cx}$ are supplied to the exhaust-gas recirculation rate control circuit 64 and causes the control circuit 64 to deliver to the vacuum-metering valve unit 34 the control signal $S_c$ effective to cause the valve unit 34 to be open to a degree dictated by the input signals $S_{cx}$. It therefore follows that the vacuum-operated exhaust-gas recirculation rate control valve unit 33 is operated to allow exhaust gases to be recirculated through the passageway 32 into the air induction system at a rate variable with the exhaust-gas recirculation rate represented by the signals $S_{cx}$ delivered from the corrected exhaust-gas recirculation rate calculator circuit 59.

In the control unit 22 of the fuel supply system constructed and operative as hereinbefore described, it is important that the optimum duration of fuel injection (signals $S_d$) and the optimum start-of-injection timing (signals $S_t$) are determined on the basis of the desired end-of-injection timing as well as the desired fuel injection rate. This is because of the fact that, since the fuel-injection nozzle assembly 21 (FIG. 2) is designed to discharge fuel at a pressure (of about 15 kgs/cm$^2$) which is lower than the maximum gas pressure to be developed in the combustion chamber during motoring of the engine, the timing at which injection of fuel is to be terminated during each cycle of operation of a power cylinder is governed by the gas pressure in the combustion chamber 19 if fuel is to be injected toward the end of each compression stroke of the cylinder. The duration of fuel injection and the start-of-injection timing determined in this manner increase and decrease as the load applied to the engine increases and decreases, respectively, as will be seen from the graph of FIG. 4. FIG. 5 shows the pressure levels $P_1$ and $P_2$ at which fuel is to be injected from nozzle assemblies in an internal combustion engine using a prior-art fuel supply system and in an internal combustion engine using the fuel supply system embodying the present invention, respectively. Curve $P_m$ shows the variation of the gas pressure in a combustion chamber of an internal combustion engine during motoring. Furthermore, segments $D_h$ and $D_w$ indicate the durations of fuel injection under high and low engine load conditions, respectively, as determined in an internal combustion engine using a fuel supply system embodying the present invention.

FIG. 6 of the drawings shows portions of a power cylinder including a modification of the fuel-injection nozzle assembly 21 in the power cylinder shown in FIG. 2. While the fuel-injection nozzle assembly 21 in the power cylinder shown in FIG. 2 is assumed to be of the externally-open type, the modified fuel injection nozzle assembly, now denoted by numeral 66, is of a dual-nozzle type having an internally-open nozzle in part surrounded by an externally-open nozzle. Thus, the fuel-injection nozzle assembly 66 comprises a nozzle housing 67 securely fitted into the cylinder head 12 and formed with an elongated valve chamber 68 open into the combustion chamber 19. A solenoid-operated first nozzle unit 69 projects into the nozzle housing 67 and is electrically connected to the battery 23 across the ignition switch 24. The first nozzle unit 69 is of the externally-open type and is per se similar to the nozzle assembly 21 in the power cylinder shown in FIG. 2. Thus, the first nozzle unit 69 comprises, in a fuel passageway formed therein, a valve urged to close the fuel passageway by a spring included in the unit 69. The nozzle assembly 66 further comprises a second nozzle unit 70 including an elongated valve element 71 movable in the valve chamber 68 and having a head portion 72 projecting from the valve chamber 68 into the combustion chamber 19. The head portion 72 is gradually enlarged in cross section toward its leading end projecting into the combustion chamber 19. The valve element 71 further has a stop portion 73 engageable with a tip portion of the first nozzle unit 69 and is thus prevented from being moved beyond a predetermined axially innermost position with respect to the nozzle housing 67. The second nozzle unit 70 further comprises biasing means urging the valve element 71 to close the valve chamber 68 by the head portion 72 thereof. In the arrangement shown in FIG. 6, the biasing means is composed of a spring seat element 74 fixedly located in the valve chamber 68 and a helical compression spring 75 which is seated at one end on the spring seat element 74 and at the other on an enlarged axially inner end portion of the valve element 71. The spring seat element 74 is formed with an aperture allowing the valve element 71 to axially move with respect to the spring seat element 74.

In the power cylinder 10 having the fuel-injection nozzle assembly 66 thus constructed and arranged, the valve element 71 of the second nozzle unit 70 is urged to close the valve chamber 68 not only by the spring 75 but by the gas pressures developed in the combustion chamber 19. Each of the spring incorporated in the first nozzle unit 69 and the spring 75 of the second nozzle unit 70 may for this reason have a relatively small spring constant and, accordingly, the actuating element such as a solenoid coil also included in the first nozzle unit 69 may of of a relatively small size compatible with the small spring constant of the spring. The fuel-injection nozzle assembly 66 further has an advantage in that only the second nozzle unit 70 may be replaced with new one when the tip portion of the nozzle assembly is corroded. The data to be stored in the electric control unit 22 for use with the fuel-injection nozzle assembly 66 is prepared in consideration of the time delays which will intervene between the timings at which signals are to be supplied from the control unit 22 to the fuel-injection nozzle assembly 66 and the timings at which the second nozzle unit 70 is to be actuated to discharge fuel into the combustion chamber 19.

What is claimed is:

1. A fuel supply system of an internal combustion engine for an automotive vehicle including a power transmission system to be driven by the internal combustion engine, the internal combustion engine having an ignition system including a power source and being of the multiple-cylinder type having a plurality of power cylinders each including a combustion chamber and a piston movable in the bore in the cylinder, comprising engine load detecting means operative to detect load on the internal combustion engine and to produce an output signal representative of the detected engine load;

an electrically-operated fuel-injection nozzle assembly projecting into a combustion chamber of a power cylinder of the engine and operative to inject fuel into the combustion chamber;

an electric control unit electrically connected to said engine load detecting means and said fuel injection nozzle assembly and operative to produce control signals to determine the durations of fuel injection and the fuel injection timings of said nozzle assembly on the basis of said control signals, the fuel injection timings being determined to occur in the presence of a gas pressure lower than the maximum gas pressure in the combustion chamber, said electric control unit comprising fuel-injection duration calculating means electrically connected to said fuel-injection nozzle assembly and operative to determine an optimum duration of fuel injection and to produce output signals representative of the optimum duration of fuel injection, and start-of-injection timing calculating means electrically connected to said fuel-injection nozzle assembly and operative to determine an optimum start-of-injection timing and to produce output signals representative of the optimum start-of-injection timing at which injection of fuel is to be started by the fuel-injection nozzle assembly during each cycle of operation of each of the power cylinders, an engine-load detector operative to produce an output signal representative of load applied to the engine, an engine-speed detector operative to produce an output signal representative of the revolution speed of the output shaft of the engine, a piston-position detector operative to produce an output signal representative of predetermined axial positions of the piston in the cylinder bore of each of the power cylinders, a cylinder detector operative to produce an output signal when the individual power cylinders of the engine reach said predetermined axial position by turns, an engine-temperature detector operative to detect a temperature in the engine and produces an output signal variable with the detected temperature, a battery-voltage detector operative to detect the voltage of said power source and produce an output signal variable with the detected voltage, a vehicle-speed detector operative to detect the vehicle speed and produce an output signal variable with the detected vehicle speed, an engine-start detector operative to detect the start of the engine and produce an output signal when the engine is cranked for starting, a gear-position detector operative to detect a condition of the power transmission system of the vehicle and produce an output signal representative of the detected predetermined condition of the power transmission system, and an idling detector operative to detect an idling condition of the engine and produce an output signal in response to an idling condition of the engine, said fuel-injection duration calculating means being operative to determine said optimum duration of fuel injection on the basis of the respective output signals from detectors selected from said engine-load detector, said engine-speed detector, said engine-temperature detector, said battery-voltage detector, said vehicle-speed detector, said engine-start detector, said gear-position detector and said idling detector, and said start-of-injection timing calculating means being operative to determine said optimum start-of-injection timing on the basis of the respective output signals from detectors selected from said engine-load detector, said engine-speed detector, said piston-position detector, said cylinder detector, said engine-temperature detector, said battery-voltage detector, said vehicle-speed detector, said engine-start detector, said gear-position detector and said idling detector.

2. A fuel supply system as set forth in claim 1, wherein said internal combustion engine further includes a spark ignition system, the fuel supply system further comprising a knocking detector operative to detect a knocking condition of the engine and produce an output signal when knocking is being caused in the engine, and a corrected ignition timing calculator circuit electrically connected to said ignition system and operative to determine an optimum ignition timing on the basis of the respective output signals from detectors selected from said engine-load detector, said engine-speed detector, said engine-temperature detector, said engine-start detector, said gear-position detector, said idling detector and said knocking detector and to produce output signals representative of the optimum ignition timing.

3. A fuel supply system as set forth in claim 2, wherein said internal combustion engine further includes an exhaust-gas recirculation system, the fuel supply system further comprising a corrected exhaust-gas recirculation rate calculator circuit electrically connected to said exhaust-gas recirculation system and operative to determine an optimum exhaust-gas recirculation rate on the basis of the respective output signals from detectors selected from said engine-load detector, said engine-speed detector, said engine-temperature detector, said engine-start detector, said gear-position detector and said idling detector and to produce output signals representative of the optimum exhaust-gas recirculation rate.

4. A fuel supply system as set forth in claim 1, 2 or 3, wherein said electric control unit further comprises a basic injection-rate calculator circuit operative to determine a basic desired fuel injection rate on the basis of the respective output signals from said engine-load detector and said engine-speed detector and to produce output signals representative of the basic desired fuel injection rate, a basic end-of-injection timing calculator circuit operative to determine a basic desired end-of-injection timing on the basis of the respective output signals from said engine-speed detector and said basic injection-rate calculator circuit and to produce output signals representative of the basic desired timing at which the injection of fuel from the fuel-injection nozzle assembly is to be terminated during each cycle of operation of each of the power cylinders, said fuel-injection duration calculating means comprising a corrected injection-rate calculator circuit operative to determine a corrected fuel injection rate on the basis of the respective output signals from said engine-temperature detector, said battery-voltage detector, said vehicle-speed detector, said engine-start detector, said gear-position detector, said idling detector and said basic injection-rate calculator circuit and to produce output signals representative of the corrected fuel injection rate, said start-of-injection timing calculating means comprising a corrected end-of-injection timing calculator circuit operative to determine a corrected end-of-injection timing on the basis of the respective output signals from said engine-temperature detector, said engine-start detector, said gear-position detector, said idling detector and said basic end-of-injection timing calculator circuit and to produce output signals representative of the corrected timing at which the injection of fuel from the fuel-injection nozzle assembly is to be terminated during each cycle of operation of each of the power cylinders, said fuel-injection duration calculating means further comprising a fuel-injection duration calculator circuit operative to determine said optimum duration of fuel injection on the basis of the respective output signals from said corrected injection-rate calculator circuit and said corrected end-of-injection timing calculator circuit and to produce output signals representative of said optimum duration of fuel injection, said start-of-injection timing calculating means further comprising a start-of-injection timing calculator circuit operative to determine said optimum start-of-injection timing on the basis of the respective output signals from said engine-speed detector, piston-position detector, cylinder detector, corrected end-of-injection timing calculator circuit and fuel-injection duration calculator circuit and to produce output signals representative of the optimum start-of-injection timing.

5. A fuel supply system as set forth in claim 4, wherein said electric control unit further comprises a basic ignition timing calculator circuit operative to determine a basic desired ignition timing on the basis of the respective output signals from said engine-speed detector and basic injection-rate calculator circuit and to produce output signals representative of the basic desired ignition timing, and a corrected ignition timing calculator circuit operative to determine a corrected ignition timing on the basis of the respective output signals from said engine-temperature detector, said engine-start detector, said gear-position detector, said idling detector, said knocking detector and said basic ignition timing calculator circuit and to produce output signals representative of the corrected ignition timing.

6. A fuel supply system as set forth in claim 5, wherein said electric control unit further comprises a basic exhaust-gas recirculation rate calculator circuit operative to determine a basic desired exhaust-gas recirculation rate on the basis of the respective output signals from said engine-speed detector and said basic injection-rate calculator circuit and to produce output signals representative of the basic desired exhaust-gas recirculation rate, and a corrected exhaust-gas recirculation rate calculator circuit operative to determine a corrected exhaust-gas recirculation rate on the basis of the respective output signals from said said engine-temperature detector, said battery-voltage detector, said engine-start detector, said gear-position detector, said idling detector and said basic exhaust-gas recirculation rate calculator circuit and to produce output signals representative of the corrected exhaust-gas recirculation rate.

7. A fuel supply system as set forth in claim 1, 2 or 3, wherein said fuel injection nozzle assembly comprises a nozzle housing securely fitted to said power cylinder and formed with a fuel passageway and an elongated valve chamber open into the combustion chamber of the power cylinder; a solenoid-operated first nozzle unit projecting into the nozzle housing and including a valve provided in said fuel passageway and biasing means urging the valve to close the fuel passageway; a second nozzle unit comprising an elongated valve element longitudinally movable in said valve chamber and having a head portion axially projecting from the valve chamber into the combustion chamber, said head portion being enlarged in cross section toward its leading end projecting into the combustion chamber, and biasing means urging the valve element to close the valve chamber by the head portion thereof.

* * * * *